(12) United States Patent
Ohashi et al.

(10) Patent No.: US 10,497,949 B2
(45) Date of Patent: Dec. 3, 2019

(54) ELECTRO-CHEMICAL REACTION UNIT AND FUEL CELL STACK

(71) Applicant: NGK SPARK PLUG CO., LTD., Nagoya-shi, Aichi (JP)

(72) Inventors: Shunta Ohashi, Komaki (JP); Nobuyuki Hotta, Konan (JP); Hiroaki Yagi, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 85 days.

(21) Appl. No.: 15/580,455

(22) PCT Filed: May 24, 2016

(86) PCT No.: PCT/JP2016/002516
§ 371 (c)(1),
(2) Date: Dec. 7, 2017

(87) PCT Pub. No.: WO2016/199362
PCT Pub. Date: Dec. 15, 2016

(65) Prior Publication Data
US 2018/0191003 A1     Jul. 5, 2018

(30) Foreign Application Priority Data
Jun. 10, 2015   (JP) .................. 2015-117491

(51) Int. Cl.
*H01M 8/0271*     (2016.01)
*H01M 8/0273*     (2016.01)
(Continued)

(52) U.S. Cl.
CPC ....... *H01M 8/0282* (2013.01); *H01M 8/0202* (2013.01); *H01M 8/0247* (2013.01);
(Continued)

(58) Field of Classification Search
None
See application file for complete search history.

(56) References Cited

U.S. PATENT DOCUMENTS

2011/0223516 A1     9/2011   Ringel et al.
2015/0318563 A1    11/2015   Kuribayashi et al.

FOREIGN PATENT DOCUMENTS

| CA | 2883115 | * | 3/2014 |
| DE | 10 2007 053 879 A1 | | 5/2009 |

(Continued)

OTHER PUBLICATIONS

Communication dated Oct. 15, 2018, issued by the European Patent Office in counterpart European Application No. 16807079.5.
(Continued)

*Primary Examiner* — Jonathan Crepeau
(74) *Attorney, Agent, or Firm* — Sughrue Mion, PLLC

(57) ABSTRACT

An electrochemical reaction unit including a unit cell; a separator bonded to a peripheral portion of the unit cell by means of a bonding member containing a brazing material; and a glass sealing member which is in contact with both the surface of the separator and the surface of the unit cell, thereby sealing between an air chamber and a fuel chamber. The separator has a first flat portion approximately parallel to a second direction perpendicular to a first direction; a second flat portion approximately parallel to the second direction; and a connection portion having a portion whose position in the first direction is different from that of the first flat portion and the second flat portion and connecting the first flat portion and the second flat portion.

7 Claims, 7 Drawing Sheets

(51) Int. Cl.
*H01M 8/1246* (2016.01)
*H01M 8/0282* (2016.01)
*H01M 8/12* (2016.01)
*H01M 8/24* (2016.01)
*H01M 8/0202* (2016.01)
*H01M 8/0247* (2016.01)
*H01M 8/2425* (2016.01)
*H01M 8/124* (2016.01)

(52) U.S. Cl.
CPC ....... *H01M 8/0271* (2013.01); *H01M 8/0273* (2013.01); *H01M 8/12* (2013.01); *H01M 8/1246* (2013.01); *H01M 8/24* (2013.01); *H01M 8/2425* (2013.01); *H01M 2008/1293* (2013.01); *Y02E 60/525* (2013.01)

(56) References Cited

FOREIGN PATENT DOCUMENTS

| | | | |
|---|---|---|---|
| JP | 11-7967 A | | 1/1999 |
| JP | 2000-331692 A | | 11/2000 |
| JP | 2013-37789 | * | 2/2013 |
| JP | 2014-049321 A | | 3/2014 |

OTHER PUBLICATIONS

Search Report dated Aug. 16, 2016, issued by the International Searching Authority in counterpart International Patent Application No. PCT/JP2016/002516 (PCT/ISA/210).

* cited by examiner

| No. | L(mm) | H(mm) | H·L (mm × mm) | DETERMINATION (CRACKING) |
|---|---|---|---|---|
| 1 | 5 | 0 | 0 | × |
| 2 | 5 | 0.1 | 0.5 | ○ |
| 3 | 5 | 0.25 | 1.25 | ○ |
| 4 | 5 | 0.4 | 2.0 | ○ |
| 5 | 5 | 0.6 | 3.0 | ○ |
| 6 | 4 | 0 | 0 | × |
| 7 | 4 | 0.1 | 0.4 | × |
| 8 | 4 | 0.25 | 1.0 | ○ |
| 9 | 4 | 0.4 | 1.6 | ○ |
| 10 | 4 | 0.6 | 2.4 | ○ |
| 11 | 3 | 0 | 0 | × |
| 12 | 3 | 0.1 | 0.3 | × |
| 13 | 3 | 0.25 | 0.75 | × |
| 14 | 3 | 0.4 | 1.2 | × |
| 15 | 3 | 0.6 | 1.8 | × |

US 10,497,949 B2

ELECTRO-CHEMICAL REACTION UNIT AND FUEL CELL STACK

TECHNICAL FIELD

A technique disclosed in the present specification relates to an electrochemical reaction unit.

BACKGROUND ART

A known type of a fuel cell for generating electricity by utilizing electrochemical reaction between hydrogen and oxygen is a solid oxide fuel cell (hereinafter may be referred to as "SOFC") which includes electrolyte layers containing a solid oxide. A fuel cell electricity generation unit (hereinafter may be referred to simply as an "electricity generation unit"), which is the smallest unit of electricity generation of an SOFC, includes a unit cell of fuel cell (hereinafter may be referred to simply as a "unit cell") and a separator. The unit cell includes an electrolyte layer, a cathode, and an anode such that the cathode and the anode face each other in a predetermined direction (hereinafter may be referred to as "direction of array") and the electrolyte layer intervenes between these electrodes. The separator has a through hole extending in the direction of array, and a portion of the separator surrounding the through hole (hereinafter the portion may be referred to as "through hole surrounding portion") is bonded to a peripheral portion of the unit cell by means of a bonding member containing a brazing material, whereby an air chamber facing the cathode is separated from a fuel chamber facing the anode.

In the electricity generation unit having the aforementioned configuration, gas leakage (cross leakage) may occur between the air chamber and the fuel chamber through the bonding member that bonds the unit cell to the separator. A known configuration for preventing such cross leakage includes a glass sealing member provided so as to be in contact with both the surface of the separator and the surface of the unit cell, thereby sealing between the air chamber and the fuel chamber (see, for example, Patent Document 1).

PRIOR ART DOCUMENT

Patent Document

Patent Document 1: Japanese Patent Application Laid-Open (kokai) No. 2014-49321

SUMMARY OF THE INVENTION

Problem to be Solved by the Invention

In the aforementioned conventional configuration, if the separator is deformed in a direction perpendicular to the direction of array (hereinafter may be referred to as "planar direction") by, for example, thermal cycle or heat shock, an excessive stress may be generated in the glass sealing member (i.e., brittle member), resulting in cracking in the glass sealing member.

Such a problem is common with an electrolysis cell unit, which is the smallest unit of a solid oxide electrolysis cell (hereinafter may be referred to as "SOEC") for generating hydrogen by utilizing electrolysis of water. In the present specification, an electricity generation unit and an electrolysis cell unit are collectively called an electrochemical reaction unit. Such a problem is common with electrochemical reaction units other than SOFC and SOEC.

The present specification discloses a technique capable of solving the aforementioned problems.

MEANS FOR SOLVING THE PROBLEM

A technique disclosed in the present specification can be implemented in the following modes.

(1) An electrochemical reaction unit disclosed in the present specification comprises a unit cell including an electrolyte layer, and a cathode and an anode which face each other in a first direction with the electrolyte layer intervening therebetween; a separator having a through hole surrounding portion which surrounds a through hole extending in the first direction and is bonded to a peripheral portion of the unit cell by means of a bonding member containing a brazing material, thereby separating an air chamber facing the cathode from a fuel chamber facing the anode; and a glass sealing member containing glass and being in contact with both the surface of the separator and the surface of the unit cell, thereby sealing between the air chamber and the fuel chamber, the electrochemical reaction unit being characterized in that the separator has a first flat portion having the through hole surrounding portion and being approximately parallel to a second direction perpendicular to the first direction; a second flat portion being approximately parallel to the second direction; and a connection portion having a portion whose position in the first direction is different from that of the first flat portion and the second flat portion and connecting the first flat portion and the second flat portion. According to the present electrochemical reaction unit, the connection portion of the separator functions like a spring which readily expands and contracts in the second direction, and the separator readily deformed in the second direction at the connection portion. Thus, if a load is applied to the separator for deformation in the second direction by, for example, thermal cycle or heat shock, the separator is deformed in the second direction generally at the connection portion, leading to a reduction in stress generated in the glass sealing member caused by the load, thereby preventing cracking in the glass sealing member.

(2) The electrochemical reaction unit may be configured such that the following relations are satisfied: $L>3$ and $H \cdot L \geq 0.5$ where L represents the length (mm) of an effective bonding portion of the bonding member in the second direction, the effective bonding portion overlapping with the separator and the unit cell in the first direction, and H represents the height (mm) of the connection portion in the first direction. According to the present electrochemical reaction unit, an increase in length L of the effective bonding portion to some extent leads to a reduction in stress per unit length of the effective bonding portion, resulting in a more effective reduction in stress in the glass sealing member and a more effective means of preventing cracking in the glass sealing member. An increase in H·L (i.e., the product of the length L of the effective bonding portion and the height H of the connection portion) to some extent leads to a sufficient height H of the connection portion for exhibiting a stress reducing effect required in accordance with the length L of the effective bonding portion.

(3) The electrochemical reaction unit may be configured such that the following relation is satisfied: $0.1 \leq H \leq 0.6$. According to the present electrochemical reaction unit, adjustment of the height H of the connection portion to a level equal to or less than the upper limit can minimize the interference between the connection portion and a gas flow channel, whereas adjustment of the height H of the connection portion to a level equal to or greater than the lower limit can secure the effect of the connection portion in reducing stress in the glass sealing member.

(4) The electrochemical reaction unit may be configured such that the following relation is satisfied: t≤0.2 where t represents the thickness (mm) of the separator in the first direction. According to the present electrochemical reaction unit, adjustment of the thickness t of the separator to a level equal to or less than the upper limit can secure the spring property of the connection portion and the effect of the connection portion in reducing stress in the glass sealing member.

(5) The electrochemical reaction unit may be configured such that the following relation is satisfied: H>t where H represents the height (mm) of the connection portion in the first direction, and t represents the thickness (mm) of the separator in the first direction. According to the present electrochemical reaction unit, adjustment of the height H of the connection portion to be greater than the thickness t of the separator can secure the effect of the connection portion in reducing stress in the glass sealing member.

(6) The electrochemical reaction unit may be configured such that the electrolyte layer contains a solid oxide. According to the present electrochemical reaction unit, since the separator has the connection portion, cracking in the glass sealing member can be prevented. In addition, cracking in the electrolyte layer (i.e., brittle member) can be prevented.

(7) The electrochemical reaction unit may be configured such that the first flat portion is approximately flush with the second flat portion in the first direction. According to the present electrochemical reaction unit, the height of the electrochemical reaction unit can be reduced in the first direction, and cracking in the glass sealing member can be prevented.

The technique disclosed in the present specification can be implemented in various modes; for example, an electrochemical reaction unit (fuel cell electricity generation unit or electrolysis cell unit), an electrochemical reaction cell stack (fuel cell stack or electrolysis cell stack) including a plurality of electrochemical reaction units, and a production method therefor.

MODES FOR CARRYING OUT THE INVENTION

A. Embodiment:
A-1. Structure:
(Structure of Fuel Cell Stack 100)

Figure 1:
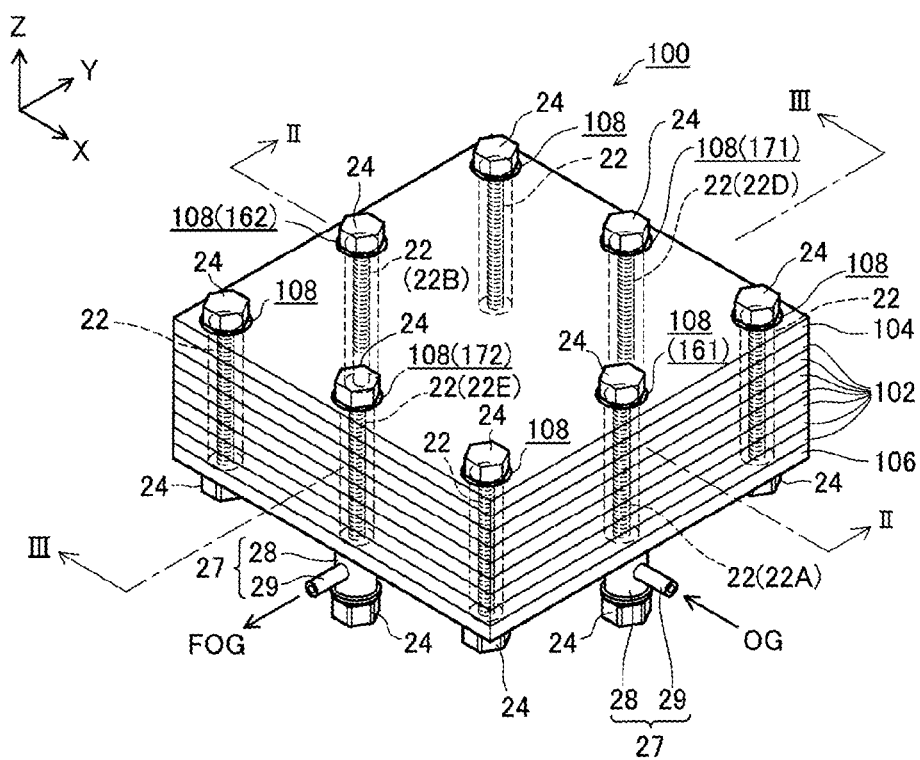
FIG. 1 Perspective view showing the external appearance of a fuel cell stack 100 according to an embodiment of the present embodiment.
Figure 2:
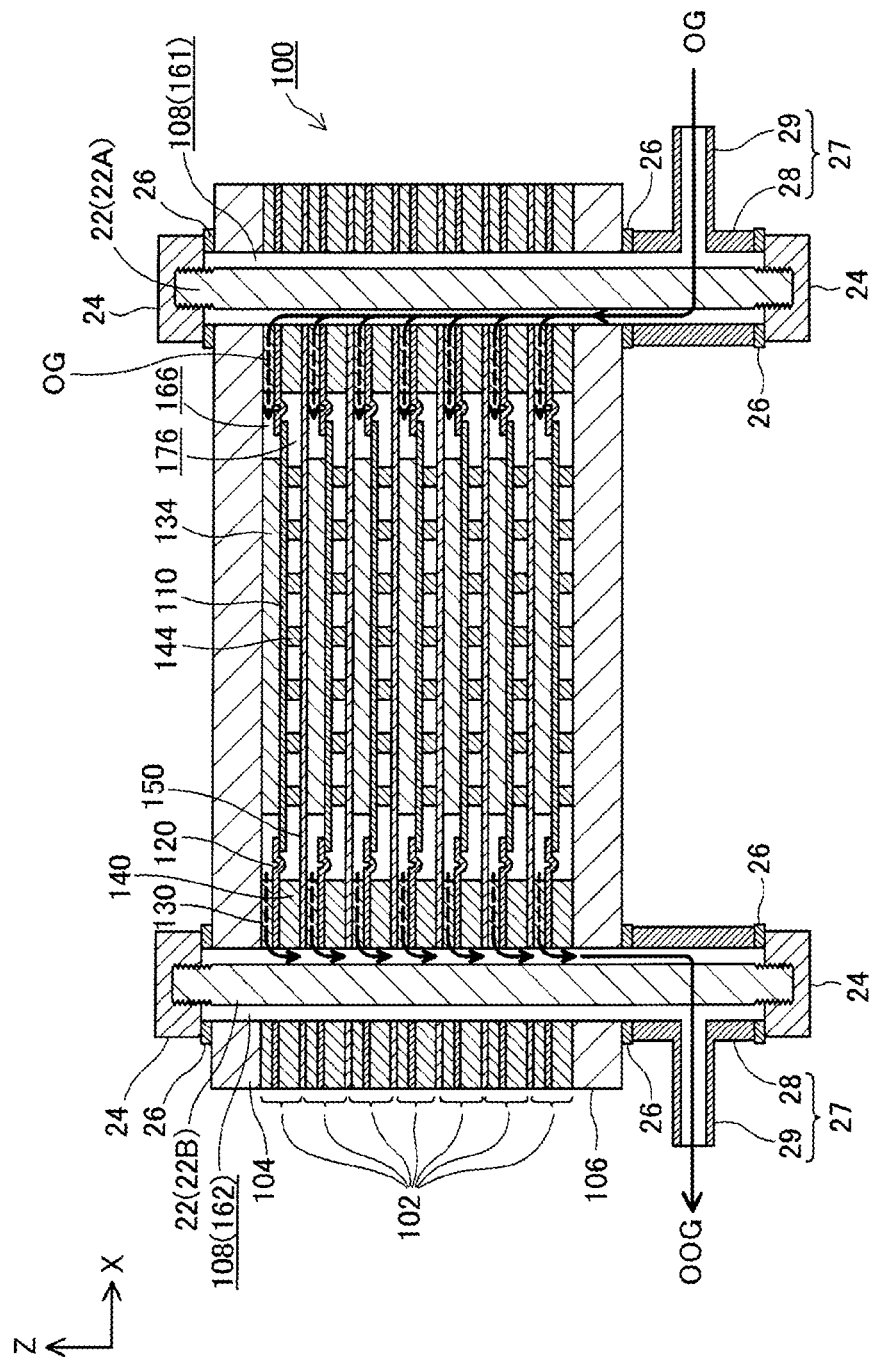
FIG. 2 Explanatory view showing an XZ section of the fuel cell stack 100 taken along line II-II of FIG. 1.
Figure 3:
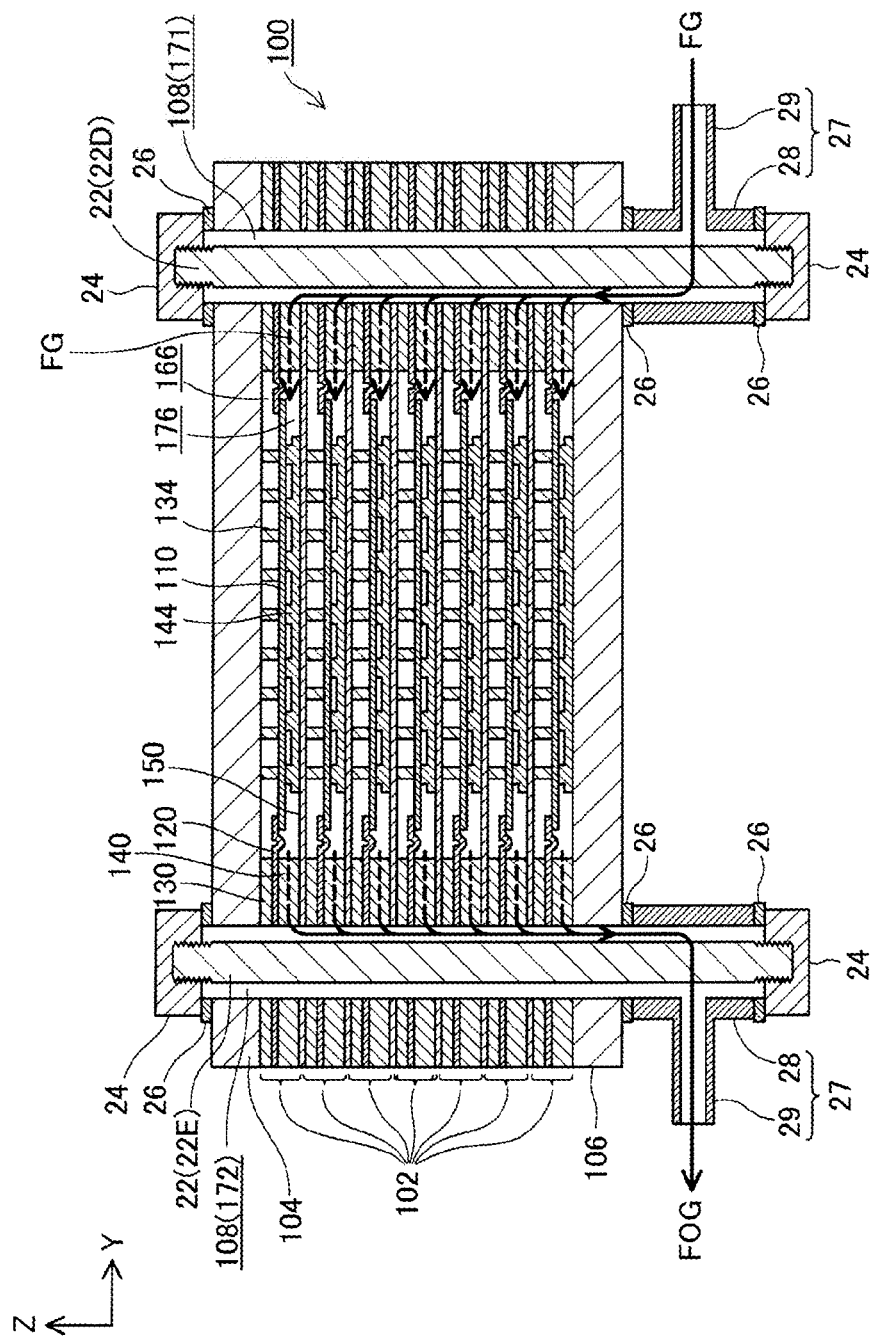
FIG. 3 Explanatory view showing a YZ section of the fuel cell stack 100 taken along line III-III of FIG. 1.

FIG. 1 is a perspective view showing the external appearance of a fuel cell stack 100 according to an embodiment of the present invention; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying orientation. In the present specification, for convenience, the positive Z-axis direction is called the upward direction, and the negative Z-axis direction is called the downward direction; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined direction of array (in the vertical direction (Z-axis direction) in the present embodiment). A pair of the end plates 104 and 106 is disposed in such a manner as to hold an assembly of the seven electricity generation units 102 from the vertical direction. The direction of array (vertical direction) corresponds to the first direction appearing in CLAIMS.

The fuel cell stack 100 has a plurality (eight in the present embodiment) of holes formed therein and extending in the vertical direction through peripheral portions about the Z-axis direction of its component layers (the electricity generation units 102 and the end plates 104 and 106), and the corresponding holes formed in the layers communicated with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may also be called the communication holes 108.

Bolts 22 extending in the vertical direction are inserted into the corresponding communication holes 108, and the fuel cell stack 100 is clamped by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG (i.e., unreacted oxidizer gas OG) discharged from the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as an fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG (containing unreacted fuel gas FG and fuel gas FG after electricity generation) discharged from the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having a rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
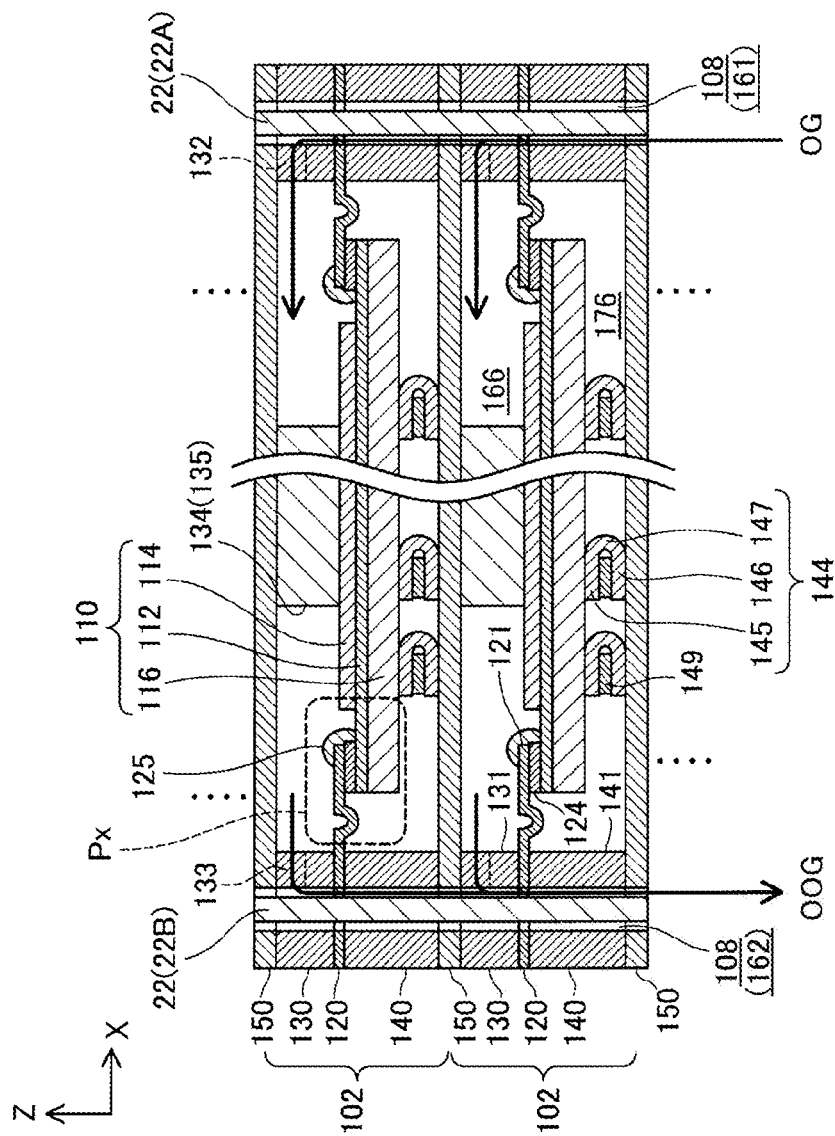
FIG. 4 Explanatory view of the same XZ section as that of FIG. 2, showing two adjacent electricity generation units 102.
Figure 5:
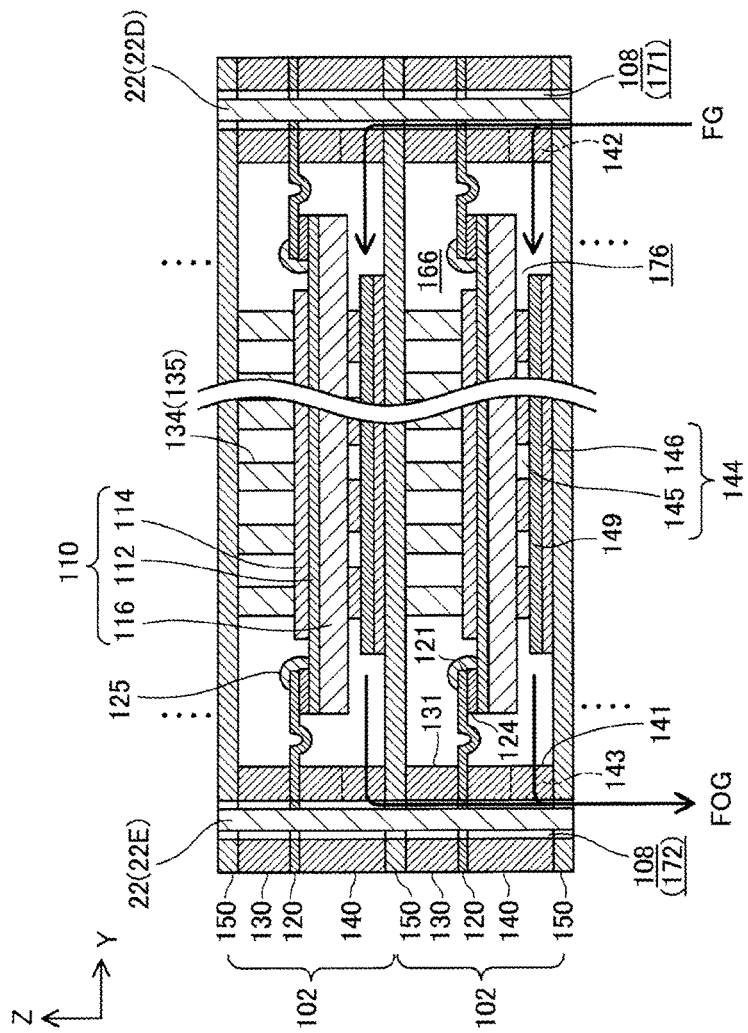
FIG. 5 Explanatory view of the same YZ section as that of FIG. 3, showing two adjacent electricity generation units 102.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102.

As shown in FIGS. 4 and 5, the electricity generation unit 102 serving as the smallest unit of electricity generation includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having a rectangular flat-plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, and a cathode 114 and an anode 116 which face each other in the vertical direction (direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114. In the present embodiment, one peripheral side of the unit cell 110 has a length of about 100 mm to about 250 mm.

The electrolyte layer 112 is a member having a rectangular flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having a rectangular flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having a rectangular flat-plate shape and is formed of, for example, Ni (nickel), a cermet of Ni and ceramic powder, or an Ni-based alloy. Thus, the unit cell 110 (electricity generation unit 102) of the present embodiment is a solid oxide fuel cell (SOFC) which uses a solid oxide as an electrolyte.

The separator 120 is a frame member which has a rectangular hole 121 formed in a central region thereof and extending therethrough in the vertical direction, and is formed of, for example, a ferritic metal. The separator 120 has a through hole surrounding portion 122 (see FIG. 6) which surrounds the hole 121 and faces a peripheral portion of the surface on the cathode 114 side of the electrolyte layer 112 of the unit cell 110. The separator 120 is bonded to the electrolyte layer 112 (the unit cell 110) by means of a bonding member 124 disposed on the through hole surrounding portion 122 and containing a brazing material (e.g., Ag brazing material). The separator 120 separates an air chamber 166 facing the cathode 114 from a fuel chamber 176 facing the anode 116. Hereinafter, the unit cell 110 to which the separator 120 is bonded may be referred to as "separator-attached unit cell." The hole 121 formed in the separator 120 corresponds to the through hole appearing in CLAIMS. The separator 120 is preferably formed of an aluminum-containing metal for the following reason. If the separator 120 is formed of such a metal, an oxide film is formed on the surface on the cathode 114 side of the separator 120, and the separator 120 is prevented from generating impurities that impair the performance of the unit cell 110.

A glass sealing member 125 containing glass is disposed on the bonding member 124 on the side toward the air chamber 166. The glass sealing member 125 is formed so as to be in contact with both the surface of the through hole surrounding portion 122 of the separator 120 and the surface of the unit cell 110 (in the present embodiment, the surface of the electrolyte layer 112 of the unit cell 110). The glass sealing member 125 effectively prevents gas leakage (cross leakage) between the air chamber 166 and the fuel member 176.

In the present embodiment, the bonding member 124 is formed so as to protrude toward the air chamber 166 from a region where the separator 120 faces the unit cell 110, and the glass sealing member 125 is formed so as to be in contact with the protruding portion of the bonding member 124. Thus, a portion of the bonding member 124 is covered with the glass sealing member 125. In the present embodiment, the glass sealing member 125 covers the surface (upper surface) of the separator 120 on the side opposite the unit cell 110; i.e., the glass sealing member 125 and the bonding member 124 face each other in the direction of array with the separator 120 intervening therebetween.

The cathode-side frame 130 is a frame member which has a rectangular hole 131 formed in a central region thereof and extending therethrough in the vertical direction, and is formed of, for example, an insulator such as mica. The hole 131 of the cathode-side frame 130 partially constitutes the air chamber 166 which faces the cathode 114. The cathode-side frame 130 is in contact with a peripheral portion of the surface on a side opposite the electrolyte layer 112 of the separator 120 and with a peripheral portion of the surface on a side toward the cathode 114 of the interconnector 150. The cathode-side frame 130 electrically insulates the two interconnectors 150 contained in the electricity generation unit 102 from each other. Also, the cathode-side frame 130 has an oxidizer gas supply communication hole 132 formed therein and adapted to establish communication between the oxidizer gas introduction manifold 161 and the air chamber 166, and an oxidizer gas discharge communication hole 133 formed therein and adapted to establish communication between the air chamber 166 and the oxidizer gas discharge manifold 162.

The anode-side frame 140 is a frame member which has a rectangular hole 141 formed in a central region thereof and extending therethrough in the vertical direction, and is formed of, for example, a metal. The hole 141 of the anode-side frame 140 partially constitutes the fuel chamber 176 which faces the anode 116. The anode-side frame 140 is in contact with a peripheral portion of the surface on a side toward the electrolyte layer 112 of the separator 120 and with a peripheral portion of the surface on a side toward the anode 116 of the interconnector 150. Also, the anode-side frame 140 has a fuel gas supply communication hole 142 formed therein and adapted to establish communication between the fuel gas introduction manifold 171 and the fuel chamber 176, and a fuel gas discharge communication hole 143 formed therein and adapted to establish communication between the fuel chamber 176 and the fuel gas discharge manifold 172.

The anode-side current collector 144 is disposed within the fuel chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface on the side opposite the electrolyte layer 112 of the anode 116, and the interconnector facing portion 146 is in contact with the surface on the side toward the anode 116 of the interconnector 150. Thus, the anode-side current collector 144 electrically connects the anode 116 and the interconnector 150 to each other. A spacer 149 formed of, for example, mica is disposed between the electrode facing portion 145 and the interconnector facing portion 146. Therefore, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150.

The cathode-side current collector 134 is disposed within the air chamber 166. The cathode-side current collector 134 is composed of a plurality of current collector elements 135 each having a rectangular columnar shape and is formed of, for example, ferritic stainless steel. The cathode-side current collector 134 is in contact with the surface on the side opposite the electrolyte layer 112 of the cathode 114 and with the surface on the side toward the cathode 114 of the interconnector 150. Thus, the cathode-side current collector 134 electrically connects the cathode 114 to the interconnector 150. The cathode-side current collector 134 and the interconnector 150 may be in the form of a unitary member.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the air chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the fuel chambers 176 through the fuel gas supply communication holes 142 of the electricity generation units 102.

When the oxidizer gas OG is supplied to the air chamber 166 of each electricity generation unit 102, whereas the fuel gas FG is supplied to the fuel chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup till the high temperature can be maintained by means of heat generated as a result of generation of electricity.

As shown in FIGS. 2 and 4, the oxidizer offgas OOG discharged from the air chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the fuel chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 6:
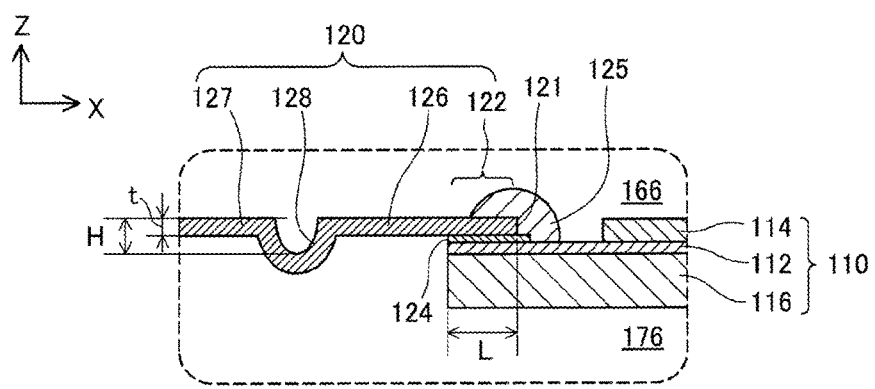
FIG. 6 Explanatory view showing the detailed structure of a separator 120.

A-3. Detailed Structure of Separator 120:

FIG. 6 is an explanatory view showing the detailed structure of the separator 120. FIG. 6 is an enlarged view of the configuration of a portion Px shown in FIG. 4. As illustrated in FIG. 6, the separator 120 has a first flat portion 126 having the through hole surrounding portion 122 and being approximately parallel to a direction (planar direction) perpendicular to the direction of array (vertical direction), and a second flat portion 127 which is located more outward than the first flat portion 126 and is approximately parallel to the planar direction. The first flat portion 126 is approximately flush with the second flat portion 127 in the direction of array.

The separator 120 also has a connection portion 128 connecting the outer end of the first flat portion 126 and the inner end of the second flat portion 127. In the present embodiment, the connection portion 128 has a shape protruding toward the fuel chamber 176 (downward) from the first flat portion 126 and the second flat portion 127. That is, the connection portion 128 is convex toward the fuel chamber 176 (convex downward); i.e., the connection portion 128 is concave toward the air chamber 166 (concave upward). Thus, the connection portion 128 has a portion whose position in the direction of array is different from that of the first flat portion 126 and the second flat portion 127. The connection portion 128 is formed so as to surround the hole 121 as viewed in the direction of array. The connection portion 128 of the separator 120 is formed by means of, for example, press working.

The connection portion 128 has the aforementioned structure and thus functions like a spring which readily expands and contracts in the planar direction. Hence, the separator 120 according to the present embodiment is readily deformed in the planar direction at the connection portion 128, as compared with a separator which does not has the connection portion 128. Thus, if a load is applied to the separator 120 for deformation in the planar direction through, for example, thermal cycle (caused by electricity generation) or heat shock (by a welding process during production), the separator 120 is deformed in the planar direction generally at the connection portion 128, leading to a reduction in stress caused by the load in the glass sealing member 125, the bonding member 124, or the electrolyte layer 112 of the unit cell 110. Since the glass sealing member 125 or the electrolyte layer 112 is formed of a brittle material (e.g., glass or ceramic material), an increase in the aforementioned stress may cause cracking. In the present embodiment, the presence of the connection portion 128 of the separator 120 can reduce the generation of a stress in the glass sealing member 125 or the electrolyte layer 112, thereby preventing the occurrence of cracking in the glass sealing member 125 or the electrolyte layer 112.

Figures 7, 8:
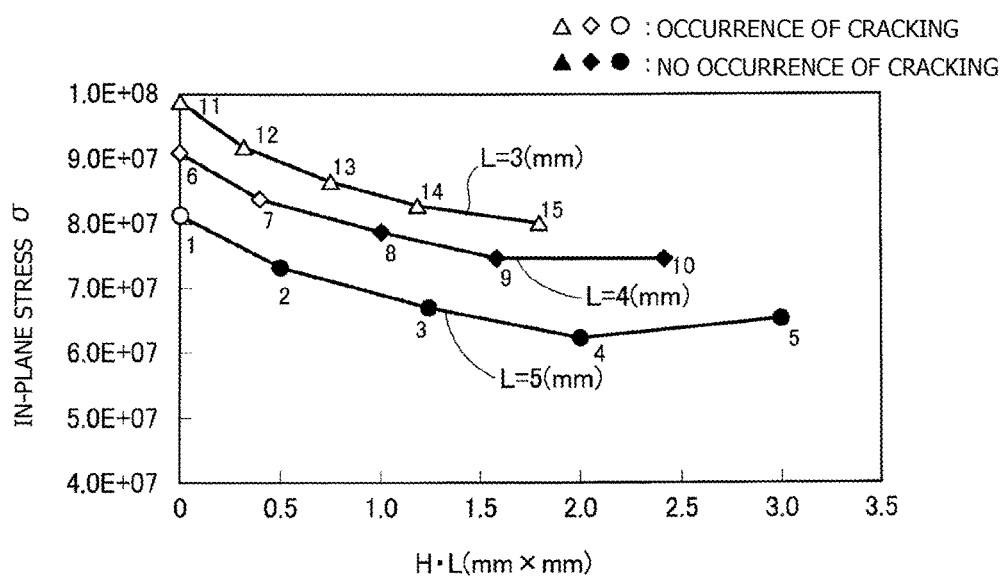
FIG. 7 Explanatory view showing the results of performance evaluation with a table.
FIG. 8 Explanatory view showing the results of performance evaluation with a graph.

A-4. Performance Evaluation:

The separator 120 was evaluated for its performance; specifically, the connection portion 128 of the separator 120 was evaluated for the effect of preventing cracking as described below. FIGS. 7 and 8 are explanatory views showing the results of performance evaluation. For the performance evaluation, a tensile load (in the planar direction) was applied to a separator-attached unit cell including the separator 120 bonded to the unit cell 110 by means of the bonding member 124 provided with the glass sealing member 125, to thereby determine whether or not cracking occurred in at least one of the glass sealing member 125 and the electrolyte layer 112. For the performance evaluation, the thickness t of the separator 120 in the direction of array was adjusted to 0.1 (mm), the tensile load in the planar direction was adjusted to 400 kgf, and the bonding member 124 was subjected to constraint conditions for prevention of sliding.

As illustrated in FIG. 7, the performance evaluation involved the use of 15 separator-attached unit cells having different combinations of connection portion height H (mm) and effective bonding portion length L (mm). As used herein, the connection portion height H corresponds to the height of the connection portion 128 in the direction of array. In more detail, the height H is the distance between the uppermost portion of the connection portion 128 and the lowermost portion thereof; i.e., the depth of the connection portion 128 as measured from the surface of the separator 120 on the cathode 166 side (see FIG. 6). The effective bonding portion length L corresponds to the length of a portion (effective bonding portion) of the bonding member 124 in the planar direction, the effective bonding portion overlapping with the separator 120 and the unit cell 110 in the direction of array. Among the 15 separator-attached unit cells (examples 1 to 15), the examples 7 and 8 were evaluated by means of experiments, and the other examples were evaluated on the basis of simulations. In the case of the experiments, the occurrence of cracking was determined by visual observation or penetrant inspection (red check). In the case of the simulations, the occurrence of cracking was determined on the basis of in-plane stress σ in the glass sealing member 125.

FIG. 7 illustrates the relationship between the effective bonding portion length L, the connection portion height H, the product of the effective bonding portion length L and the connection portion height H (index value H·L), and the results of determination of cracking for each separator-attached unit cell example. In FIG. 7, "O" indicates determination of no cracking, whereas "X" indicates determination of cracking. FIG. 8 illustrates the relationship between the index value H·L and the in-plane stress σ in the glass sealing member 125 for each separator-attached unit cell example. In FIG. 8, numerals attached to the data correspond to example numbers illustrated in FIG. 7. In FIG. 8, a black triangle, square, or circle corresponds to an example in which no cracking was determined, and a white triangle, square, or circle corresponds to an example in which cracking was determined.

In the separator-attached unit examples 1, 6, and 11, the connection portion height H is 0 (mm); i.e., the separator 120 does not have the connection portion 128. In these examples, the occurrence of cracking was determined. The reason for this is probably as follows. Since the separator 120 does not have the connection portion 128, if a load is applied to the separator 120 for deformation in the planar direction, an excessive stress is generated in the glass sealing member 125 or the electrolyte layer 112.

In the separator-attached unit cell examples 2 to 5, the effective bonding portion length L is 5 (mm), and the connection portion height H is 0.1 (mm) to 0.6 (mm). In these examples, no occurrence of cracking was determined. The reason for this is probably as follows. Since the separator 120 has the connection portion 128, if a load is applied to the separator 120 for deformation in the planar direction, the separator 120 is deformed in the planar direction generally at the connection portion 128, leading to prevention of generation of an excessive stress in the glass sealing member 125 or the electrolyte layer 112.

In the separator-attached unit cell examples 7 to 10, the effective bonding portion length L is 4 (mm), and the connection portion height H is 0.1 (mm) to 0.6 (mm). Among these examples, no occurrence of cracking was determined in the examples 8, 9, or 10 wherein the connection portion height H is 0.25, 0.4, or 0.6 (mm), respectively, but the occurrence of cracking was determined in the example 7 wherein the connection portion height H is 0.1 (mm). The reason for this is probably as follows. If the connection portion height H is relatively small, the connection portion 128 is less likely to deform in the planar direction. Thus, when a load is applied to the separator 120 for deformation in the planar direction, the connection portion 128 exhibits a relatively low effect of reducing a stress generated in the glass sealing member 125 or the electrolyte layer 112.

In the separator-attached unit example 2, the connection portion height H is 0.1 (mm) (which is the same as that in the example 7), but no occurrence of cracking was determined. The reason for this is probably as follows. In the example 2, the effective bonding portion length L is longer than that in the example 7, and thus the stress per unit length of the bonding member 124 (effective bonding portion) is relatively low, resulting in relatively low stress in the glass sealing member 125 or the electrolyte layer 112. Thus, the connection portion height H is preferably increased in accordance with a decrease in the effective bonding portion length L. Specifically, the index value H·L is preferably 0.5 or more on the basis of the results of performance evaluation illustrated in FIGS. 7 and 8. As illustrated in FIG. 8, in a range where the index value H·L is a certain level or more, the amount of a decrease in in-plane stress σ with an increase in index value H·L is reduced. The size of the separator-attached unit cell needs to be increased for increasing the index value H·L. From these viewpoints, the index value H·L is preferably 3.0 or less.

In the separator-attached unit examples 12 to 15, the effective bonding portion length L is 3 (mm), and the connection portion height H is 0.1 (mm) to 0.6 (mm). In these examples, the occurrence of cracking was determined. The reason for this is probably as follows. In the case where the effective bonding portion length L is considerably small, the stress per unit length of the bonding member 124 (effective bonding portion) is considerably increased. Thus, the connection portion 128 of the separator 120 cannot reduce the stress in the glass sealing member 125 or the electrolyte layer 112 to a level such that no cracking occurs. The effective bonding portion length L is preferably greater than 3 (mm) on the basis of the results of performance evaluation illustrated in FIGS. 7 and 8.

Preferably, the effective bonding portion length L is greater than 3 (mm) and the index value H·L is 0.5 or more on the basis of the results of performance evaluation described above. If these conditions are satisfied, the stress per unit length of the bonding member 124 (effective bonding portion) can be reduced, and the stress in the glass sealing member 125 or the electrolyte layer 112 can be more effectively reduced, resulting in more effective prevention of cracking in the glass sealing member 125 or the electrolyte layer 112. In addition, the height H of the connection portion 128 can be adjusted to a level sufficient for exhibiting a stress reducing effect required in accordance with the effective bonding portion length (L) of the bonding member 124.

The connection portion height H is more preferably 0.1 (mm) to 0.6 (mm). Adjustment of the connection portion height H to 0.1 (mm) or more can secure the effect of the connection portion 128 in preventing cracking. If the connection portion height H is more than 0.6 (mm), the connection portion 128 may undesirably block gas flow, resulting in impaired electricity generation performance. Adjustment of the connection portion height H to 0.6 (mm) or less can prevent impairment of electricity generation performance due to blocking of gas flow by the connection portion 128.

The thickness t of the separator 120 in the direction of array is 0.01 (mm) or more. From the viewpoint of preventing impairment of oxidation resistance, the thickness t is preferably 0.03 (mm) or more, more preferably 0.05 (mm) to 0.2 (mm). Adjustment of the thickness t of the separator 120 to 0.03 (mm) or more can prevent impairment of the oxidation resistance of the separator 120. Adjustment of the thickness t of the separator 120 to 0.2 (mm) or less can maintain the spring property of the connection portion 128 to a certain extent or more, and can secure the effect of the connection portion 128 in preventing cracking.

The connection portion height H is preferably greater than the thickness t of the separator 120. Adjustment of the connection portion height H to be greater than the thickness t of the separator 120 can secure the effect of the connection portion 128 in preventing cracking.

Preferably, the first flat portion 126 is approximately flush with the second flat portion 127 in the direction of array. In such a case, the height of the separator-attached unit cell can be reduced in the direction of array as compared with the case where the positions of the first flat portion 126 and the second flat portion 127 differ from each other in the direction of array, and thus the heights of the electricity generation unit 102 and the fuel cell stack 100 can be reduced in the direction of array.

A-5. Measuring Method:

The effective bonding portion length L is measured by, for example, a method utilizing cross-sectional observation, an X-ray microscope, or a computed tomograph (CT). The connection portion height H is measured by, for example, method utilizing cross-sectional observation or a laser shape measuring device. Next will be described a method for measuring the connection portion height H by means of a laser shape measuring device.

Figure 9:
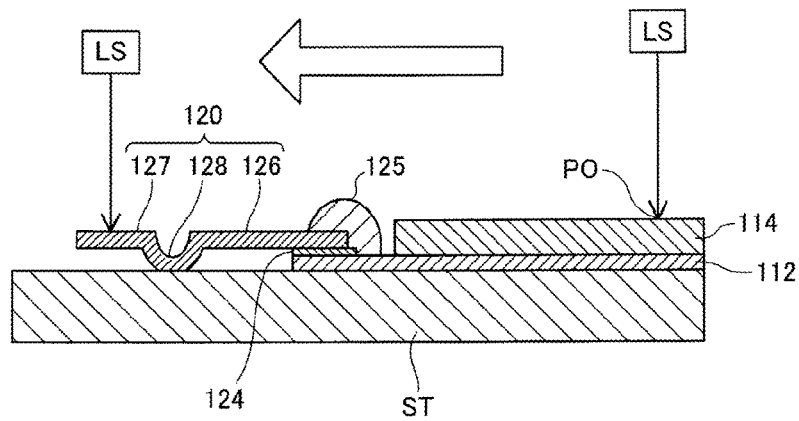
FIG. 9 Explanatory view showing a method for measuring a connection portion height H by means of a laser shape measuring device LS.
Figure 10:
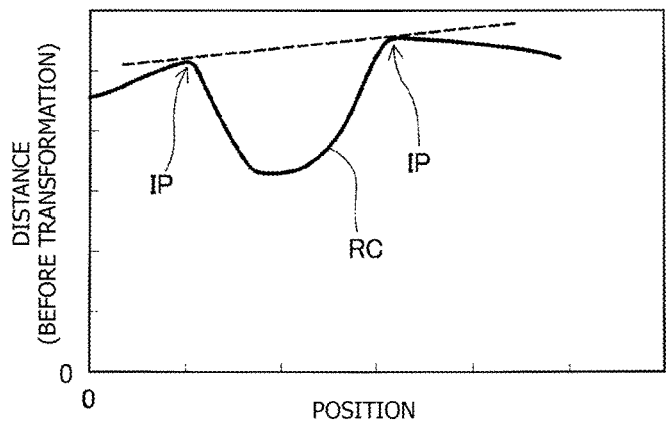
FIG. 10 Explanatory view showing a method for correcting the results of measurement.
Figure 11:
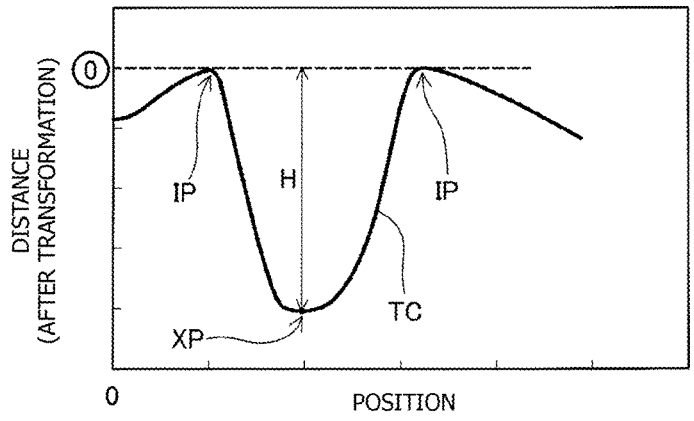
FIG. 11 Explanatory view showing a method for correcting the results of measurement.

FIGS. 9 to 11 are explanatory views illustrating a method for measuring the connection portion height H by means of a laser shape measuring device LS. FIG. 9 illustrates the state where the connection portion height H of a separator-attached unit cell is measured by means of the laser shape measuring device LS. FIGS. 10 and 11 illustrate a method for correcting the results of measurement.

As illustrated in FIG. 9, a work (separator-attached unit cell) is placed on a stage ST movable in an XY direction; a measurement zero point PO is defined on the separator-attached unit cell; and the distance between the separator-attached unit cell and the laser shape measuring device LS is measured while the relative position between the laser shape measuring device LS, which is located at a fixed position, and the separator-attached unit cell is varied by moving the stage ST. FIG. 10 illustrates a curve (untransformed curve RC) corresponding to the results of measurement.

Thereafter, as illustrated in FIG. 10, two inflection points IP are extracted from a region of the untransformed curve RC, the region corresponding to the position of the separator 120. These inflection points are applied to a predetermined correction formula, thereby preparing a curve (transformed curve TC) wherein two inflection points IP are transformed into points at distance zero as illustrated in FIG. 11. Point XP where the Z-direction distance (i.e., height) is the largest is extracted from a region between the two inflection points IP of the transformed curve TC, and the height at the point XP is determined as the connection portion height H.

B. Modifications

The technique disclosed in the present specification is not limited to the above embodiment, but may be modified into various other forms without departing from the gist thereof. For example, the technique may be modified as described below.

In the above embodiment, the first flat portion 126 is approximately flush with the second flat portion 127 in the direction of array. However, the positions of the first flat portion 126 and the second flat portion 127 may differ from each other in the direction of array.

In the above embodiment, the connection portion 128 has a shape protruding toward the fuel chamber 176 (downward) from the first flat portion 126 and the second flat portion 127 as viewed in cross section. However, the structure of the connection portion 128 is not limited to the aforementioned one, so long as the connection portion 128 has a portion whose position in the direction of array is different from that of the first flat portion 126 and the second flat portion 127. For example, the connection portion 128 may have a shape protruding toward the air chamber 166 (upward) from the first flat portion 126 and the second flat portion 127 as viewed in cross section. In the above embodiment, the first flat portion 126 and the second flat portion 127 are approximately parallel to the planar direction. However, the positions of these portions in the direction of array may differ from each other, and the connection portion 128 may connect the first flat portion 126 and the second flat portion 127 in a straight or curved manner.

In the above embodiment, the connection portion 128 is formed on the separator 120 by means of, for example, press working. However, the connection portion 128 may be formed by any other technique (e.g., machining).

In the above embodiment, the bonding member 124 is formed so as to protrude toward the air chamber 166 from a region where the separator 120 faces the unit cell 110, and the glass sealing member 125 is formed so as to be in contact with the protruding portion of the bonding member 124 and to cover the surface (upper surface) of the separator 120 on the side opposite the unit cell 110; i.e., the glass sealing member 125 and the bonding member 124 face each other in the direction of array with the separator 120 intervening therebetween. However, the glass sealing member 125 does not necessarily have the aforementioned structure. For example, the glass sealing member 125 is not necessarily in contact with the bonding member 124, or the glass sealing member 125 does not necessarily cover the surface (upper surface) of the separator 120 on the side opposite the unit cell 110. The bonding member 124 may be formed only in a portion of the region where the separator 120 faces the unit cell 110. In such a structure, the glass sealing member 125 may intrude into the region where the separator 120 faces the unit cell 110.

In the above embodiment, the number of the electricity generation units 102 contained in the fuel cell stack 100 is a mere example and is determined as appropriate in accordance with, for example, a required output voltage of the fuel cell stack 100.

In the above embodiment, spaces between the outer circumferential surfaces of shaft portions of the bolts 22 and the inner circumferential surfaces of the communication holes 108 are utilized as manifolds. However, axial holes may be formed in the shaft portions of the bolts 22 for use as the manifolds. Also, the manifolds may be provided separately from the communication holes 108 into which the bolts 22 are inserted.

In the above embodiment, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiment, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiment, the anode-side current collector 144 may have a structure similar to that of the cathode-side current collector 134; i.e., the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiment, materials used to form the members are provided merely by way of example. Other materials may be used to form the members.

In the above embodiment, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the present specification, a structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be said to be a structure in which the cathode 114 and the anode 116 face each other with the electrolyte layer 112 intervening therebetween.

In the above embodiment (or the above modifications; the same also applies in the following description), all of the electricity generation units 102 contained in the fuel cell stack 100 have a structure such that the separator 120 has the first flat portion 126 and the second flat portion 127 which are approximately parallel to the planar direction, and the connection portion 128 having a portion whose position in the direction of array is different from that of the first flat portion 126 and the second flat portion 127 and connecting the first flat portion 126 and the second flat portion 127. However, if at least one of the electricity generation units 102 contained in the fuel cell stack 100 has such a structure, the occurrence of cracking can be prevented in the glass sealing member 125 or the electrolyte layer 112 of the electricity generation unit 102.

The above embodiment refers to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2014-207120, detailed description thereof is omitted, schematically, the electrolysis cell stack has a structure similar to that of the fuel cell stack 100 in the above embodiment. That is, the fuel cell stack 100 in the above embodiment may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor supplied as material gas through the communication hole 108. As a result, the electrolysis of water occurs in the electrolysis cell units, whereby hydrogen gas is generated in the fuel chambers 176, and hydrogen is discharged to the outside of the electrolysis cell stack through the communication hole 108.

Even in the electrolysis cell unit and the electrolysis cell stack having the above structures, the occurrence of cracking can be prevented in the glass sealing member 125 or the electrolyte layer 112 through employment of a structure similar to that of the above embodiment; i.e., a structure such that the separator 120 has the first flat portion 126 and the second flat portion 127 which are approximately parallel to the planar direction, and the connection portion 128 having a portion whose position in the direction of array is different from that of the first flat portion 126 and the second flat portion 127 and connecting the first flat portion 126 and the second flat portion 127.

The above embodiment is described while referring to the solid oxide fuel cell (SOFC); however, the present invention is also applicable to other types of fuel cells (or electrolysis cells), such as a polymer electrolyte fuel cell (PEFC), a phosphoric-acid fuel cell (PAFC), and a molten carbonate fuel cell (HCFC).

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 104: end plate; 106: end plate; 108: communication hole; 110: unit cell; 112: electrolyte layer; 114: cathode; 116: anode; 120: separator; 121: hole; 122: through hole surrounding portion; 124: bonding member; 125: glass sealing member; 126: first flat portion; 127: second flat portion; 128: connection portion; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: air chamber; 171: fuel gas introduction manifold; 172: fuel gas discharge manifold; 176: fuel chamber.

The invention claimed is:

1. An electrochemical reaction unit comprising:
   a unit cell including an electrolyte layer, and a cathode and an anode which face each other in a first direction with the electrolyte layer intervening therebetween;
   a separator having a through hole surrounding portion which surrounds a through hole extending in the first direction and is bonded to a peripheral portion of the unit cell by means of a bonding member containing a brazing material, thereby separating an air chamber facing the cathode from a fuel chamber facing the anode; and
   a glass sealing member containing glass and being in contact with both the surface of the separator and the surface of the unit cell, thereby sealing between the air chamber and the fuel chamber, the electrochemical reaction unit being characterized in that:
   the separator has:
   a first flat portion having the through hole surrounding portion;
   a second flat portion being closer to the peripheral portion of the unit cell than the first flat portion; and
   a connection portion having a portion whose position in the first direction is different from that of the first flat portion and the second flat portion, connecting the first flat portion and the second flat portion, and protruding toward one direction along the first direction from the first flat portion and the second flat portion wherein the following relations are satisfied:

$$L>3 \text{ and } H \cdot L \geq 0.5$$

where L represents the length (mm) of an effective bonding portion of the bonding member in a second direction perpendicular to the first direction, the effective bonding portion overlapping with the separator and the unit cell in the first direction, and H represents the height (mm) of the connection portion in the first direction.

2. An electrochemical reaction unit according to claim 1, wherein the following relation is satisfied:

$$0.1 \leq H \leq 0.6.$$

3. An electrochemical reaction unit according to claim 1, wherein the following relation is satisfied:

$$t \leq 0.2$$

where t represents the thickness (mm) of the separator in the first direction.

4. An electrochemical reaction unit according to claim 1, wherein the following relation is satisfied:

$$H>t$$

where H represents the height (mm) of the connection portion in the first direction, and t represents the thickness (mm) of the separator in the first direction.

5. An electrochemical reaction unit according to claim 1, wherein the electrolyte layer contains a solid oxide.

6. An electrochemical reaction unit according to claim 1, wherein the first flat portion is approximately flush with the second flat portion in the first direction.

7. A fuel cell stack comprising a plurality of fuel cell electricity generation units, the fuel cell stack being characterized in that at least one of the fuel cell electricity generation units is an electrochemical reaction unit as recited in claim 1.

* * * * *